Sept. 11, 1956  T. GRONNEBERG  2,762,191
EXPANSIBLE BRACELET WITH DETACHABLE TONGUE CONNECTED LINKS
Filed Oct. 7, 1954
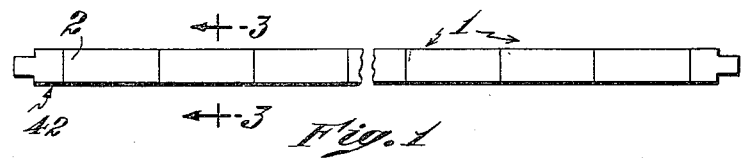
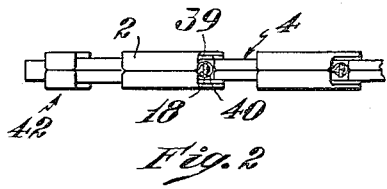
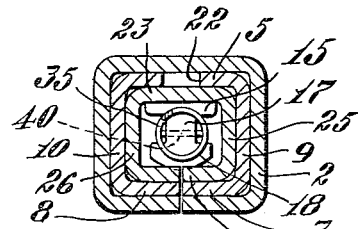
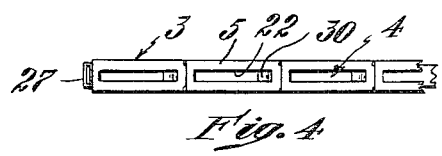
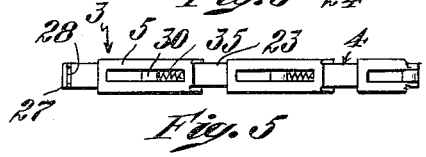
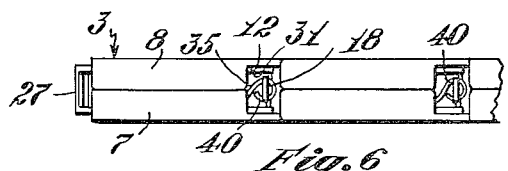
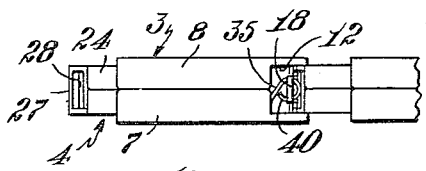
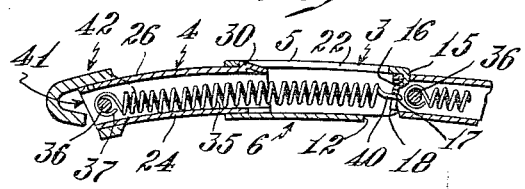
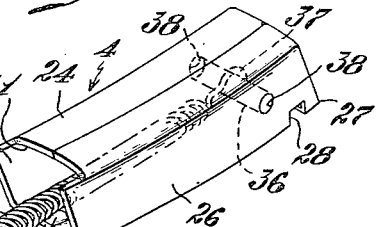
Inventor
Trygve Gronneberg
by Roberts, Cushman & Grover
Attys

United States Patent Office 2,762,191
Patented Sept. 11, 1956

2,762,191

EXPANSIBLE BRACELET WITH DETACHABLE TONGUE CONNECTED LINKS

Trygve Gronneberg, East Greenwich, R. I., assignor to Elgin National Watch Company, Elgin, Ill., a corporation of Illinois Application October 7, 1954, Serial No. 460,904

7 Claims. (Cl. 59—79)

This invention relates to expansible bracelets used, for example, in securing a watch or the like to the wrist, and more particularly to an expansible bracelet of the type including a plurality of telescoping links, the contraction and expansion of which are controlled by tension springs.

Objects of the present invention are to provide an expansible bracelet of the character described in which the plurality of links may be readily and conveniently detached and assembled by the user or retailer for the purpose of repair, replacement or alteration of the overall length of the bracelet, without mutilation of the parts, without requiring return of the bracelet to the manufacturer, without interfering with the advantage of increased expansion capacity secured by tension as distinct from compression springs, and which insures that the parts, when assembled, are secured against inadvertent or accidental displacement.

Other objects of the invention are to provide an expansible bracelet of the character described which, while securing the above advantages, is of simple and durable construction and of a highly desirable narrow width, easy and economical to manufacture, sufficiently flexible to permit the bracelet smoothly to conform to the contour of the wrist, attractive in appearance and adaptable to variations in external design with a minimum of alteration in the parts.

In one aspect the invention comprises an expansible bracelet comprising a plurality of detachable links, each of said links including a tubular outer member and a tubular inner member telescopically slidable therein, each inner member having a transverse slot in one side near one end, each outer member having an upstanding tongue hooked through said slot of the next link, each link having a tension spring within the inner member, one end of the spring being anchored to the inner member near said end of the inner member and the opposite end of the spring being detachably anchored over the tip of the tongue. One of the members of each link has an opening adjacent the tip of the tongue for providing ready access to said opposite end of the spring. Preferably the upper part of the tongue has a reentrant portion and an upstanding tip, each outer member having an opening adjacent the tip of the tongue for providing ready access to said opposite end of the spring.

In a more specific aspect the tongue has a reduced neck portion adjacent its tip defining shoulders between the neck and tip, the opposite end of the spring having a loop detachably slidable over the tip of the tongue and anchored beneath the shoulders. The tip of the tongue has a convex outer edge.

In another aspect each outer member has a longitudinally extending slot in one side and each inner member has an upwardly struck lug in the said one side near its other end extending into said slot to limit the relative sliding movement of the members.

In still another aspect each of the links includes an outer shell, the tubular outer member being fast within said outer shell, each outer shell having an opening adjacent the tip of the tongue for providing ready access to said opposite end of the spring.

For the purpose of illustration a typical embodiment of the invention is shown in the accompanying drawings in which Fig. 1 is a top plan view with the bracelet in contracted position and with part broken out;

Fig. 2 is a fragmentary, bottom plan view of the bracelet of Fig. 1 in an expanded position;

Fig. 3 is a section along the line 3—3 of Fig. 1;

Fig. 4 is a fragmentary, top view of the bracelet of Fig. 1 with the outer shells omitted and the bracelet in contracted position;

Fig. 5 is a view similar to Fig. 4 with the bracelet in an expanded position;

Fig. 6 is a fragmentary, bottom plan view of the bracelet of Fig. 1 on an enlarged scale with the outer shells omitted and the bracelet in contracted position;

Fig. 7 is a view similar to Fig. 6 with the bracelet in an expanded position;

Fig. 8 is a longitudinal section on an enlarged scale at one end of the bracelet of Fig. 1 with the outer shells omitted except for the terminal shell and with the bracelet in fully expanded position; and Fig. 9 is an exploded, isometric view on an enlarged scale of the telescoping parts of the bracelet in inverted position.

With reference to the drawings, the bracelet comprises a series of links 1, each link comprising an outer shell 2, an outer tubular member 3 and an inner tubular member 4 telescopically slidable in said outer tubular member.

Each outer tubular member 3 is cut and formed from a flat, thin metal plate into a substantial box-shape and has a top wall 5, a bottom wall 6 formed by rolled-over flanges 7 and 8 and side walls 9 and 10. At one end 11 of the member 3 the bottom wall 6 is formed with a recess 12 and the side walls are formed with longitudinally extending convex ends. At the opposite end 13 of the member 3 the side walls are formed with concave ends.

The top wall 5 is formed at the end 11 with an integral upstanding tongue 14 having a transverse base 15, a reentrant portion 16 and an upstanding neck portion 17 and tip 18 within the recess 12, the neck being reduced to define shoulders 19 between the neck and reentrant portion and shoulders 20 between the neck and tip, the tip having a convex outer edge 21. The top wall 5 is also formed with a slot 22 extending longitudinally of the member and being closed at each end.

Each inner tubular member 4 is cut and formed from a flat, thin metal plate into a substantial box-shape and has a top wall 23, a bottom wall 24 and side walls 25 and 26. Adjacent the end 27 of the inner member 4 the top wall 23 is formed with a transverse slot 28 (Fig. 9) and adjacent the opposite end 29 the top wall is provided with an upwardly struck lug 30 and the bottom wall 24 is formed with a recess 31.

The inner tubular member 4 is disposed within the outer tubular member 3 and is telescopically slidable longitudinally thereof from a contracted position therewithin (Figs. 4 and 6) to an expanded position with a portion thereof outside the member 3 (Figs. 5 and 7). When the members are telescopically disposed, the lug 30 extends into and is slidable longitudinally of the slot 22, and when the members are in the expanded position shown in Fig. 8, the lug 30 engages the closed end of the slot to limit further expansion and to prevent the inner member from being completely withdrawn from the outer member.

The transverse base 15 of the tongue 14 passes through the transverse slot 28 at the end 27 of the inner tubular member of the next preceding link (Fig. 8), thereby hingedly to interconnect adjacent links.

A tension spring 35 for normally urging the inner tubular members of each link to contracted position is disposed within the tubular inner member 4 and is anchored at one of its ends near the end 27 of the member 4 by suitable means as a pin 36 which extends through a loop 37 provided at the end of the spring and thence extends transversely of the member through openings 38 provided in the side walls 25 and 26, the ends of the pin being frictionally engaged within the openings.

The opposite end of the spring is formed with a loop 40 of slightly larger diameter than the transverse width of the tongue tip 18 and is slidably disposed over the tip and anchored about the neck portion of the tongue beneath the shoulders 20, thereby at the same time to lock the tongue from accidental withdrawal from the transverse slot of the next preceding link.

The outer shell 2 of each link is preferably formed of decorative sheet metal and is of the same shape as the outer tubular member 3 including the provision of a recess 39 at one end in registry with the recess 12 of the member 3 (Fig. 2) and covers the member 3, conceals the slot 22 in said member, and is in frictional engagement with said member to hold the shell in fixed relation thereto (Fig. 3).

At the extreme end 41 of the bracelet there is provided an outer terminal shell 42 (Figs. 1, 2 and 8) of box-like shape which accommodates within its confines an end portion of the end 27 of the inner member 4 of the next link, the inner member and outer terminal shell being interconnected by suitable means as the pin 36 of said inner member which extends through said openings 38 in the side walls of the member and thence through openings (not shown) in the side walls of the outer terminal shell, the projecting ends of the pin being peened over to form retaining heads.

To assemble the bracelet, the inner and outer tubular members of each link may first be assembled as follows. Prior to rolling over the flanges 7 and 8 of the bottom wall 6 of the outer tubular member 3, the inner tubular member 4 having one end of the spring 35 already anchored near the end 27 of the member by the pin 36 as heretofore described, is disposed within said outer member with the lug 30 slidably received within the slot 22. Thereafter the flanges are rolled over into closed position to lock the members in telescopically slidable relationship.

With the members of each link thus assembled and with reference to Figs. 8 and 9, the outer tubular member 3 of the first link from the end 41 of the bracelet may then be hingedly connected to the inner tubular member 4 of the next link by inserting the tip of the tongue 14 into the slot 28 until the transverse base 15 is received therewithin with the end 27 of the top wall 23 of the inner member resting upon the inner face of the top wall 5 of the outer member. Succeeding links of the bracelet may then be similarly hingedly connected throughout the length of the bracelet.

Thereafter the hooked point of a tool shaped, for example, like the point of a crochet needle, is inserted through the recess 12 in the outer member 3 of the first link and into and rearwardly of the inner tubular member 4 of the first link until the loop 40 of the opposite end of the spring 35 is caught within the hook. With the spring loop thus confined, the tool is withdrawn until the hooked point is over the tip of the tongue after which the tool is urged inwardly against the tongue to cause the loop to slide over the convex outer edge of the tongue tip onto the neck of the tongue where it becomes engaged beneath the shoulders 20 thereby both to become anchored and at the same time serving to lock the tongue from accidental withdrawal through the slot 28.

The action of anchoring the loop of the spring on the tongue tensions the spring 35, thereby to urge the inner and outer tubular members of the first link into contracted position (Fig. 6) and thereafter the tool is twisted to release the loop from the hook and is withdrawn through the recesses 31 and 12 of said inner and outer members, respectively. The springs of the succeeding links of the bracelet may then be similarly anchored.

As the last step in the assembly, the outer member 3 of each link is covered by the decorative outer shell 2 by rolling the shell about said member, it being understood that the design of the bracelet may be varied at will by using outer shells of varied designs without altering or distorting the other parts of the bracelet, it being further understood that the outer terminal shell 42 was previously secured to the end 27 of the inner tubular member 4 of the first link by the pin 36 as heretofore described.

To detach one link, for example, from the fully assembled bracelet for the purpose of repair, replacement or alteration of the overall length of the bracelet, the retailer or user need only insert the hooked point of the tool into the recesses 39, 31 and 12 of the outer shell, outer tubular member and inner tubular member, respectively, of the link desired to be detached, engage the loop 40 of the spring within the hook and then withdraw the tool until the hooked point is over the tip of the tongue, which action causes the loop to become disengaged from the shoulders 20 and to slip outwardly over the tip of the tongue. The loop is then released from the hook causing the spring to contract inwardly within the inner member. The same steps are then followed in releasing the loop 40 of the spring of the next preceding link and thereafter the tongue of the link desired to be detached may be withdrawn from the slot of the inner tubular member of the next succeeding link and the tongue of the preceding link is similarly withdrawn from the slot of the inner tubular member of the link desired to be detached, thereby to completely detach the desired link from the bracelet. While the foregoing description was confined to the detachment of one link, it is to be understood that two or more links may be similarly detached if desired.

The bracelet may then be reassembled without the detached link or links by assembling the formerly preceding and succeeding links in the same manner as above described in connection with the assembly of successive links of the bracelet.

It should be understood that the present disclosure is for the purpose of illustration only and that this invention includes all modifications and equivalents which fall within the scope of the appended claims.

I claim:

1. An expansible bracelet comprising a plurality of detachable links, each of said links including a tubular outer member and a tubular inner member telescopically slidable therein, each inner member having a transverse slot in one side near one end, each outer member having an upstanding tongue hooked through said slot of the next link, each link having a tension spring within the inner member, one end of the spring being anchored to the inner member near said end of the inner member and the opposite end of the spring being detachably anchored over the tip of the tongue.

2. An expansible bracelet comprising a plurality of detachable links, each of said links including a tubular outer member and a tubular inner member telescopically slidable therein, each inner member having a transverse slot in one side near one end, each outer member having an upstanding tongue hooked through said slot of the next link, each link having a tension spring within the inner member, one end of the spring being anchored to the inner member near said end of the inner member and the opposite end of the spring being detachably anchored over the tip of the tongue, one of the members of each link having an opening adjacent the tip of the tongue for providing ready access to said opposite end of the spring.

3. An expansible bracelet comprising a plurality of detachable links, each of said links including a tubular outer member anb a tubular inner member telescopically slidable therein, each inner member having a transverse slot in one side near one end, each outer member having an upstanding tongue hooked through said slot of the next link, the upper part of the tongue having a reentrant portion and an upstanding tip, each link having a tension spring within the inner member, one end of the spring being anchored to the inner member near said end of the inner member and the opposite end of the spring being detachably anchored over the tip of the tongue, each outer member having an opening adjacent the tip of the tongue for providing ready access to said opposite end of the spring.

4. An expansible bracelet comprising a plurality of detachable links, each of said links including a tubular outer member and a tubular inner member telescopically slidable therein, each inner member having a transverse slot in one side near one end, each outer member having an upstanding tongue hooked through said slot of the next link, the tongue having a reduced neck portion adjacent its tip defining shoulders between the neck and tip, each link having a tension spring within the inner member, one end of the spring being anchored to the inner member near said end of the inner member and the opposite end of the spring having a loop detachably slidable over the tip of the tongue and anchored beneath the shoulders.

5. An expansible bracelet comprising a plurality of detachable links, each of said links including a tubular outer member and a tubular inner member telescopically slidable therein, each inner member having a transverse slot in one side near one end, each outer member having an upstanding tongue hooked through said slot of the next link, the tip of the tongue having a convex outer edge and the tongue having a reduced neck portion adjacent the tip defining shoulders between the neck and the tip, each link having a tension spring within the inner member, one end of the spring being anchored to the inner member near said end of the inner member and the opposite end of the spring having a loop detachably slidable over the tip of the tongue and anchored beneath the shoulders.

6. An expansible bracelet comprising a plurality of detachable links, each of said links including a tubular outer member and a tubular inner member telescopically slidable therein, each inner member having a transverse slot in one side near one end, each outer member having an upstanding tongue hooked through said slot of the next link, each outer member having a longitudinally extending slot in one side and each inner member having an upwardly struck lug in its said one side near its other end extending into said slot to limit the relative sliding movement of the members, each link having a tension spring within the inner member, one end of the spring being anchored to the inner member near said end of the inner member and the opposite end of the spring being detachably anchored over the tip of the tongue.

7. An expansible bracelet comprising a plurality of detachable links, each of said links includiing an outer shell, a tubular outer member fast within said outer shell and a tubular inner member telescopically slidable therein, each inner member having a transverse slot in one side near one end, each outer member having an upstanding tongue hooked through said slot of the next link, each link having a tension spring within the inner member, one end of the spring being anchored to the inner member near said end of the inner member and the opposite end of the spring being detachably anchored over the tip of the tongue, each outer shell and outer tubular member having an opening adjacent the tip of the tongue for providing ready access to said opposite end of the spring.

References Cited in the file of this patent

UNITED STATES PATENTS

| | | |
|---|---|---|
| 1,056,528 | Foster | Mar. 18, 1913 |
| 1,567,640 | Guyot | Dec. 29, 1925 |
| 1,659,438 | Nelson | Feb. 14, 1928 |
| 2,433,657 | Flaig | Dec. 30, 1947 |
| 2,434,729 | Whitehead | Jan. 20, 1948 |

FOREIGN PATENTS

| | | |
|---|---|---|
| 213,632 | Great Britain | Apr. 1, 1924 |